United States Patent
Norman et al.

(10) Patent No.: US 7,337,057 B2
(45) Date of Patent: Feb. 26, 2008

(54) METHODS AND APPARATUS FOR PREDICTING AND/OR FOR AVOIDING LEAN BLOW-OUTS

(75) Inventors: Bruce Gordon Norman, Ballston Lake, NY (US); Avinash Vinayak Taware, Niskayuna, NY (US); Minesh Ashok Shah, Clifton Park, NY (US); Ajai Singh, Clifton Park, NY (US); Willy Steve Ziminsky, Simpsonville, SC (US); Pingchuan Wu, Shanghai (CN)

(73) Assignee: General Electric Company, Schenectady, NY (US)

( * ) Notice: Subject to any disclaimer, the term of this patent is extended or adjusted under 35 U.S.C. 154(b) by 746 days.

(21) Appl. No.: 10/856,583

(22) Filed: May 28, 2004

(65) Prior Publication Data

US 2005/0278108 A1 Dec. 15, 2005

(51) Int. Cl.
  *G06F 19/00* (2006.01)
  *F02C 9/00* (2006.01)
(52) U.S. Cl. ............... 701/100; 60/773; 60/39.27
(58) Field of Classification Search ............ 701/100; 60/39.091, 39.27, 39.281, 773, 779, 774
See application file for complete search history.

(56) References Cited

U.S. PATENT DOCUMENTS

| 5,477,685 | A | 12/1995 | Samuelson et al. |
| 5,551,227 | A | 9/1996 | Moulton et al. |
| 5,924,275 | A | 7/1999 | Cohen et al. |
| 6,059,560 | A | 5/2000 | Richards et al. |
| 6,516,263 | B1 | 2/2003 | Keller |
| 6,705,081 | B2 | 3/2004 | Kamen et al. |
| 6,722,135 | B2 | 4/2004 | Davis, Jr. et al. |
| 2005/0274116 | A1* | 12/2005 | Thornton et al. ............ 60/776 |
| 2005/0276306 | A1* | 12/2005 | Mick et al. ................ 374/117 |
| 2006/0042261 | A1* | 3/2006 | Taware et al. ............... 60/773 |

FOREIGN PATENT DOCUMENTS

EP  0 774 573 B1  2/2002

\* cited by examiner

*Primary Examiner*—Thomas Black
*Assistant Examiner*—Marie A Weiskopf
(74) *Attorney, Agent, or Firm*—Armstrong Teasdale LLP

(57) ABSTRACT

A method for predicting lean blow-outs (LBOs) in a gas turbine engine includes extracting a plurality of tones in pressure signals representative of pressure within monitored combustor cans, tracking a frequency of a hot tone in each monitored can, and utilizing the extracted tones and the tracked frequency to determine a probability of an LBO.

44 Claims, 2 Drawing Sheets

METHODS AND APPARATUS FOR PREDICTING AND/OR FOR AVOIDING LEAN BLOW-OUTS

BACKGROUND OF THE INVENTION

This invention relates generally to gas turbine engine control and more particularly to methods and apparatus for providing advance warning or avoidance of lean blow-outs.

Fuel and air are combined in a combustion process in gas turbine engines. To control the production of oxides of nitrogen (NOx) in this process, the combustion process is controlled by controlling flame temperature. Fuel and air can be premixed uniformly to avoid high combustion temperatures, and the engine can be operated below certain temperatures to avoid production of unacceptable amounts of NOx.

Gas turbines with dry low NOx combustion systems operate at very lean F/A (Fuel/Air) ratios closer to a Lean Blowout (LBO) boundary in order to maintain low NOx emissions. F/A ratios leaner than the LBO boundary value can result in partial or complete blowout of the flame. Further, can-to-can F/A ratio variability results in cans having F/A ratios closer to the LBO boundary that are more prone to blowout than cans that are operating at a larger margin from the LBO boundary. A blowout in one can sometimes leads to blowout in several adjacent cans, which can eventually trigger a turbine shutdown. Turbine trips due to LBO can be costly, and revenue can be lost during downtime and physical damage can be inflicted on the combustion components due to the blowout.

BRIEF DESCRIPTION OF THE INVENTION

Some configurations of the present invention therefore provide a method for predicting lean blow-outs (LBOs) in a gas turbine engine. The method includes extracting a plurality of tones in pressure signals representative of pressure within monitored combustor cans, tracking a frequency of a hot tone in each monitored can, and utilizing the extracted tones and the tracked frequency to determine a probability of an LBO.

Also, some configurations of the present invention provide an apparatus for predicting lean blow-outs (LBOs) in a gas turbine engine. The apparatus is configured to extract a plurality of tones from signals representative of pressure within monitored combustor cans, track a frequency of a hot tone in each monitored can, and utilize the extracted tones and the tracked frequency to determine a probability of an LBO.

In addition, some configurations of the present invention provide a method for avoiding lean blow-outs (LBOs) in a gas turbine engine. The method includes extracting a plurality of tones in pressure signals representative of pressure within monitored combustor cans, tracking a frequency of a hot tone in each monitored can, and utilizing the extracted tones and the tracked frequency to determine a probability of an LBO. The method further includes signaling a controller to take corrective action to prevent an LBO when the determined LBO probability is indicative of an incipient LBO.

Furthermore, some configurations of the present invention provide an apparatus for avoiding lean blow-outs (LBOs) in a gas turbine engine. The apparatus is configured to extract a plurality of tones from signals representative of pressure within monitored combustor cans, track a frequency of a hot tone in each monitored can, and utilize the extracted tones and the tracked frequency to determine a probability of an LBO. The apparatus is further configured to signal a controller to take corrective action to prevent an LBO when the determined LBO probability is indicative of an incipient LBO.

It will be appreciated that various methods, such as the use of various evidential signatures observed in measured combustion dynamics or acoustics of combustor cans, facilitates detection of incipient blowout in various configurations of the present invention. By providing early detection, a controller can be provided with a greater opportunity to take corrective action to avoid the blowout.

DETAILED DESCRIPTION OF THE INVENTION

Some configurations of the present invention utilize a relative change of RMS values of different tones along with an LBO tone in conjunction with a frequency shift of one of the tones together with an RMS value of the LBO tone to arrive at a probability of LBO. The tones are obtained utilizing high response pressure probes disposed within combustors to monitor pressure fluctuations in the combustors. The signals from these pressure probes is analyzed in manner described below.

Figure 1:
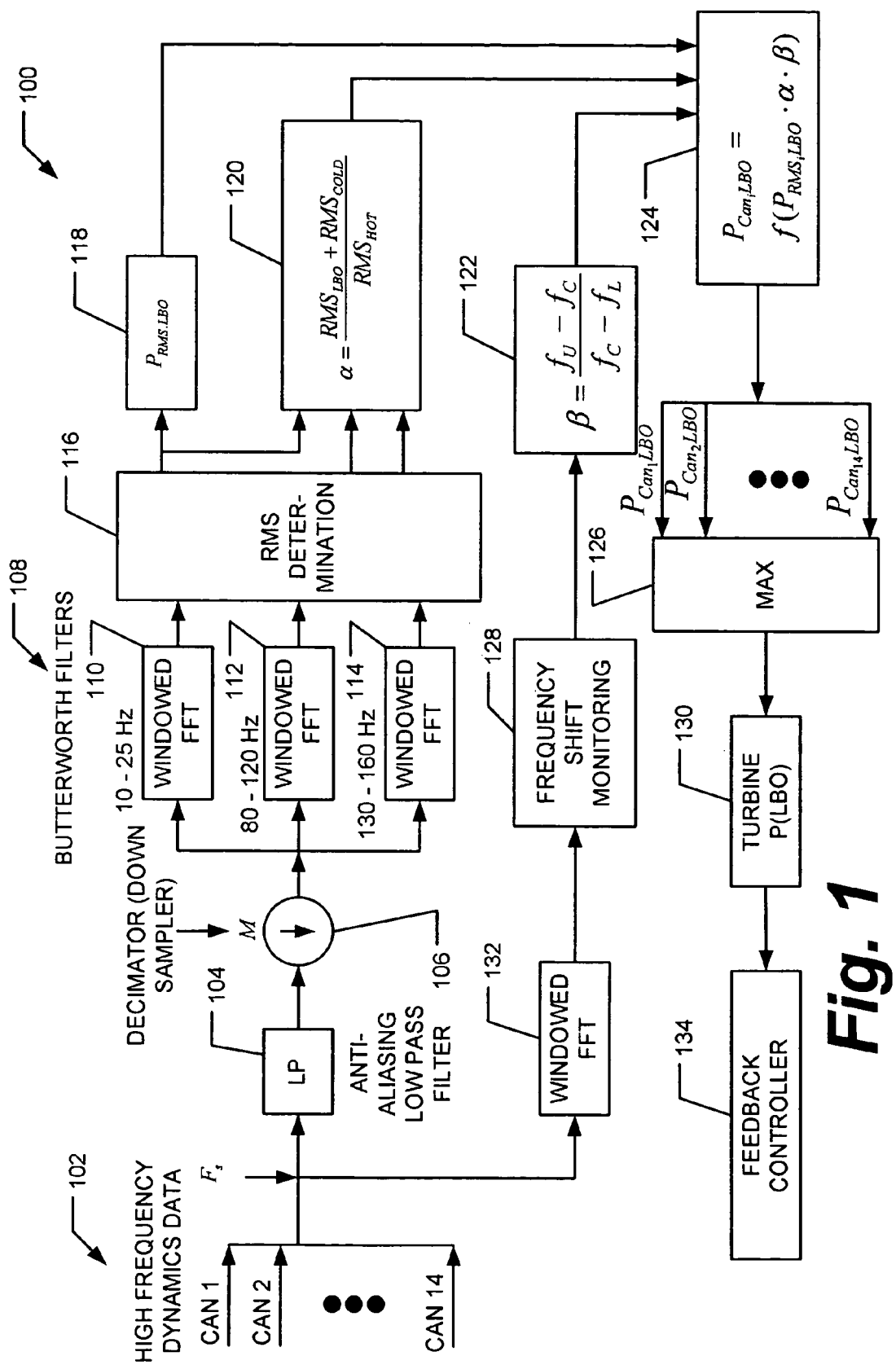
FIG. 1 is a block schematic drawing representative of some configurations of a lean blow-out prediction/prevention system of the present invention.

In some configurations of the present invention and referring to FIG. 1, a lean blow-out prediction/prevention system 100 comprises an RMS signal extraction module 116 configured to extract different tones, a frequency tracking module 128 for the hot tone and an LBO probability determination module 124. Detection logic 100 utilizes spectral observation of the dynamics of a signal and of signatures evident upon an incipient blowout. A GE gas turbine 7FA, for example, has 14 cans and exhibits three tones, an LBO tone (10-25 Hz), a cold tone (80-120 Hz) and a hot tone (130-160 Hz). The signatures include energy changes in the LBO tone, the cold tone and hot tone as well as frequency shifting of the hot tone as the combustor approaches LBO. For example, in one experiment, spectrograms of can dynamics during a LBO event indicated that the LBO tone strengthens while the hot tone weakens and shifts its frequency.

In some configurations of LBO detection logic 100 and referring to the schematic or logical diagram of FIG. 1, dynamics signals 102 from pressure probes from each monitored can (for example, 14 cans) are sampled at a high frequency, $F_s$, and are passed through one or more anti-aliasing filters 104. The resulting signals are applied to a down sampler 106, which reduces computational load by down sampling dynamics recorded at high frequency (in KHz) to a more manageable frequency (in Hz) for RMS value calculation. For example, if $F_s$=24 KHz, then a decimator rate of M=48 can be selected to reduce the sampling rate to 500 Hz. Bandpass filters 108, for example, Butterworth filters 110, 112, and 114 are used at the output of down sampler 106 to filter out the LBO tone (filter 110), the cold tone (filter 112), and the hot tone (filter 114) signals. The RMS value of the filtered out tones is then determined in an RMS determination block 116. RMS values in some configurations are low pass filtered using moving average filters to reduce noise. The tones are extracted for each monitored can, and the RMS values are determined for each tone for each monitored can.

As used herein, a "monitored can" is a combustor can that both (a) is sensed by a pressure sensor (which may be an audio transducer) and (b) has a signal processed by LBO detection logic 100. For example, the present invention permits configurations in which a large number of signals 102 are received from cans, but some of these signals are ignored by LBO detection logic 100. The cans having signals that are ignored are not "monitored cans," as that term is used herein.

Figure 2:
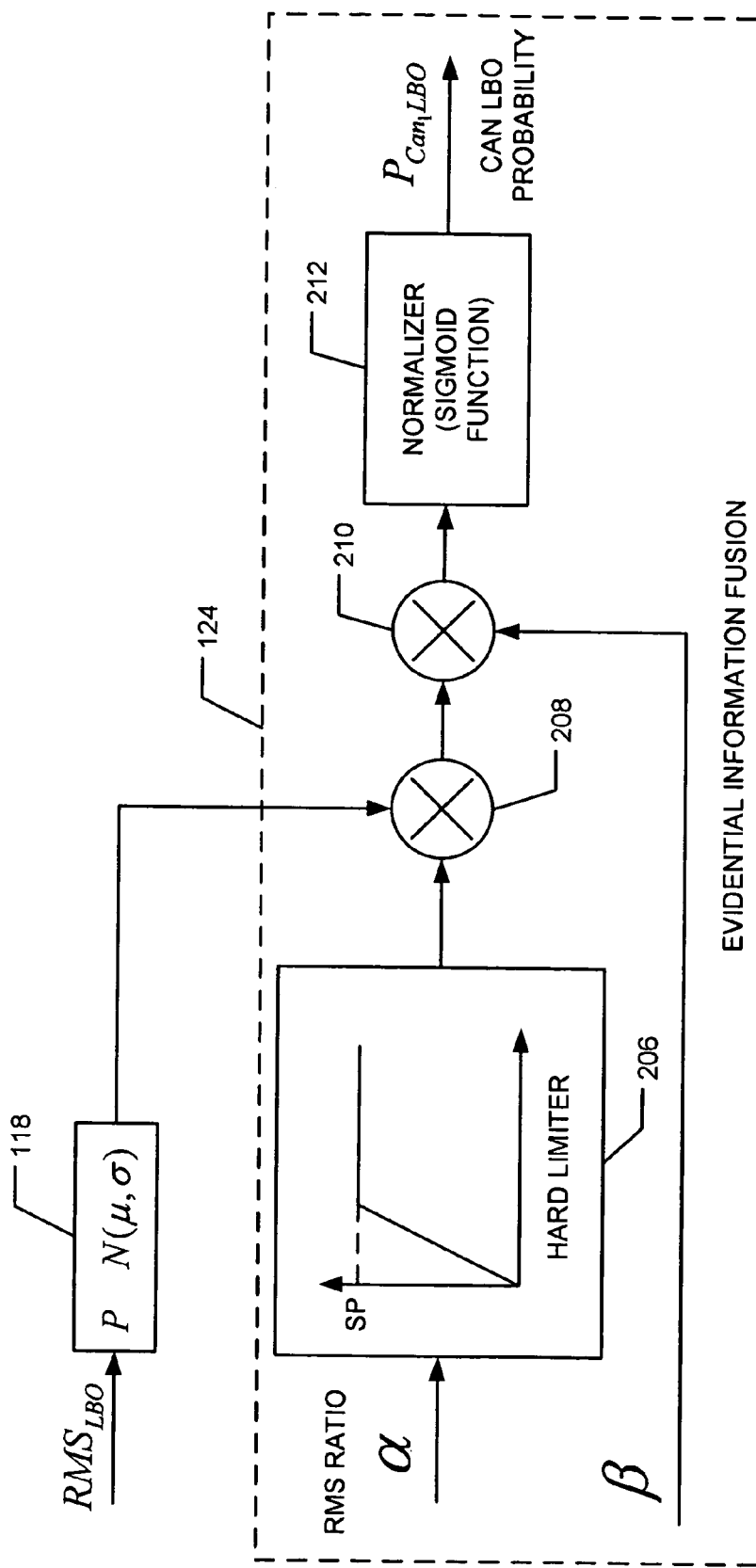
FIG. 2 is a block schematic drawing representative of an evidential information fusion block (i.e., probability determination module) useful in configurations of the present invention represented by FIG. 1.

The frequency shift in the hot tone for each monitored can is monitored using a windowed FFT technique. A basic LBO probability, $P_{RUS_i,LBO}$, is determined in block 118 using the LBO tone RMS value, where subscript i is an index that ranges from 1 to the number of cans. A cumulative probability function of a normal distribution is used and the mean and variance are chosen to achieve a desired probability of LBO for a given RMS value of the LBO tone at block 124. In some configurations and referring to FIG. 2, this LBO probability is enhanced by two derived pieces of evidential information:

The RMS ratio, $\alpha$, determined by block 120 and which reflects the relative change in the three tones $$\alpha = \frac{RMS_{LBO} + RMS_{COLD}}{RMS_{HOT}}, \text{ and}$$

the frequency shift, $\beta$, of the hot tone, determined at block 122 from sampled signals filtered through a windowed FFT block at 132 and monitored for frequency shifting at 128, where $\beta$ is defined as:

$$\beta = \frac{f_U - f_C}{f_C - f_L},$$

where $f_U$ is the upper bound of the hot tone frequency, $f_L$ is the lower bound of the hot tone frequency and $f_C$ is the instantaneous center frequency of the hot tone. Parameters $f_U$ and $f_L$ are set to the cutoff frequencies of the hot tone bandpass filter. The parameter $\alpha$ in some configurations hard-limited, as shown at 206, to maintain resolution after the probability is normalized. Multiplier 208 multiplies the hard-limited value of $\alpha$ by the LBO probability obtained from block 118. Multiplier 210 multiplies the result by $\beta$. The resulting LBO probability for a can is enhanced and normalized between 0 and 1 using a sigmoid function written as:

$$P_{Can_i,LBO} = f_{sigmoid}(P_{RMS_i,LBO} \cdot \alpha \cdot \beta)$$

This function gives the probability of LBO of a single can. The parameter $\alpha$ is hard limited to maintain appropriate can LBO resolution after the probability is normalized. In this way, the LBO probability is monitored for all combustor cans. The gas turbine LBO probability at a given time is determined by maximum selector block 126 as the maximum of all the computed can LBO probabilities at that time instant. in some configurations, this probability P(LBO) at 130 is used by a feedback controller 134 to initiate corrective action and avoid a blowout.

Various configurations of lean blow-out prediction/prevention system 100 can be implemented using discrete sampling and logic components, and/or a suitably programmed computer or microprocessor, and/or suitable signal processing components and/or software or firmware.

In some configurations of the present invention, tunable parameters of the three modules of the proposed variant of the algorithm include RMS computation. For example, RMS computation module 116 is configured to extract LBO tone, cold tone, and hot tone components from down sampled dynamics data and to compute respective RMS values (in psi) before applying a moving average filter to reduce noise.

The decimate rate or the down sampling rate M of decimator 106 in some configurations is chosen so that the down-sampled frequency is greater than twice the frequency range of interest. In the present example, the frequency of interest is up to 200 Hz. Thus, M is chosen to down sample the rate to a value greater than 400 Hz. As the sampling frequency, $F_s$ changes, M may be adjusted accordingly.

The window size (number of samples) for RMS determination block 116 in some configurations is chosen to give resolution fine enough to track the RMS value over time and is synchronized with the hot tone frequency tracking in time.

Low pass (anti-aliasing) filter coefficients for filter 104 are configured in some configurations in a second order section structure. In some configurations, filter 104 is redesigned if the sampling frequency changes so that the 3 dB cutoff frequency is at the upper bound of frequency region of interest (200 Hz in this example).

In some configurations, bandpass filter 110, 112, and 114 coefficients are configured in a second order section structure. The sampling frequency of filters 110, 112, and 114 is the down-sampled frequency. Filters 110, 112, and 114 in some configurations are redesigned if the down-sampled frequency changes. In some configurations, the LBO, cold tone and hot tone bands are tuned differently for different gas turbines (7FA) machines.

In some configurations, a moving average filter size for RMS value smoothing 116 is set to 5 samples. Increasing the filter size enhances noise reduction at the expense of introducing additional delay.

In some configurations, hot tone frequency tracking module 128 tracks the hot tone dominant frequency ($f_c$) by applying non-overlapping Hanning window FFT computation on a time domain raw acoustics signal. The FFT window size sets the time resolution at a particular sampling frequency. For example, the use of 8192 points gives 0.64 second time resolution at a 12.8 KHz sampling rate. The down-sampling rate M and RMS window size in some configurations is coordinated to synchronize the RMS value vectors and the hot tone frequency vector. In some configurations, however, interpolation is used to align the frequency shift vector with the RMS value in time. If the number of FFT scans to average is set to a value greater than one, less noisy frequency tracking is obtained at the expense of increased computational time. The use of window overlap results in increased time resolution and improved accuracy of frequency tracking, at the expense of time delay as compared to a no overlap configuration. In some configurations, the lower and higher bounds of the hot tone match the hot tone band pass filter settings.

LBO probability computation module 124 determines LBO probability in accordance with a predefined statistical model, using LBO tone RMS signal as an input. The probability is then refined using two items of evidential information, $\alpha$ and $\beta$, which are the RMS ratio and the frequency shift of the hot tone, respectively. In various configurations, the enhanced LBO probability is then subjected to nonlinear normalization between 0 and 1 using a sigmoid function at block 212. In some configurations, the threshold for 95% probability of an LBO event is tuned using the RMS value of the LBO tone. The mean and variance of the statistical model is also tuned in some configurations using historical LBO tone data of the turbine. Also in some configurations, the ratio $\alpha$ is hard limited by block 206 using a threshold SP that itself can be tuned using historical LBO data. Parameters, $Q_0, Q_1$, which control mapping performance of the sigmoid function, are adjusted in some configurations to map the enhanced probability value at the maximum value of $\alpha \times \beta$ to 1 according to a relationship written as:

$$P_{Can_i \cdot LBO}(t) = 1 \Big/ \left(1 + e^{-(2(P_{RMS_i \cdot LBO}(t) \cdot \alpha \cdot \beta) - Q_1)/Q_0}\right)$$

A configuration as described above was provided to analyze four LBO events, three occurring in a GE 7FA gas turbine and one in a GE 9H gas turbine. The configuration correctly predicted the LBOs in each event with the LBO probability growing and becoming unity before the turbine trip. This prediction corresponds to a window of opportunity to take corrective action that would avoid the LBO. In some cases the LBO probability indicated a LBO event as early as 25 seconds before the actual LBO.

In one of the 7FA events, the machine tripped during extended turndown. The acoustic data for the 14 cans was sampled at 24 KHz. Two cans (Cans 6 and 12) were eliminated from analysis, as their data was corrupt due to faulty cables. The decimation rate was kept at 48 to set the down-sampled frequency to 500 Hz. The bands for bandpass filters 110, 112, and 114 were appropriately selected. The RMS window size was adjusted to generate a value every 0.5 seconds. The FFT window size was kept at 12000 samples with no overlap in order to track the hot tone frequency every 0.5 seconds. Spectrograms of the dynamics data collected for the different cans during the LBO event clearly showed evidential pieces of information such as the hot tone frequency shift as well as the relative change in the magnitudes of the different tones. Also, the LBO became prominent and stronger as the turbine approached LBO.

LBO detection results from this experiment were obtained. As the LBO tone became stronger, the probability of blowout for every can peaked up. Parameters $\alpha$ and $\beta$ peaked up as well because as the LBO tone became stronger, the hot tone weakened and shifted in frequency. The cold tone became stronger for some of the cans. The product of $\alpha$ and $\beta 0$ peaked up as a result. The probability of LBO was enhanced by this product and normalized using a sigmoid function. The maximum of probability of all the cans was selected at every time instant to indicate the turbine trip probability. The probability peaked above 0.75 almost 28 seconds before the turbine trips (i.e., when power dropped to zero) and 23 seconds before the exhaust temperature spread started increasing. Thus, a 23 second time window to take corrective action to avoid an LBO was provided.

While the invention has been described in terms of various specific embodiments, those skilled in the art will recognize that the invention can be practiced with modification within the spirit and scope of the claims.

What is claimed is:

1. A method for predicting lean blow-outs (LBOs) in a gas turbine engine, said method comprising:

extracting a plurality of tones in pressure signals representative of pressure within monitored combustor cans;
tracking a frequency of a hot tone in each monitored can; and
utilizing the extracted tones and the tracked frequency to determine a probability of an LBO.

2. A method in accordance with claim 1 wherein said determined probability of an LBO is higher when the hot tone weakens and its frequency is shifted.

3. A method in accordance with claim 1 wherein said extracting a plurality of tones comprises extracting, for each monitored can, an LBO tone, a cold tone, and a hot tone, and determining RMS values for each said tone.

4. A method in accordance with claim 3 wherein said extracting a plurality of tones further comprises downsampling the pressure signals, and extracting an LBO tone, a cold tone, and a hot tone comprises utilizing band pass filters having pass bands of 10-25 Hz, 80-120 Hz, and 130-160 Hz, respectively, to extract each said tone from the downsampled pressure signals.

5. A method in accordance with claim 3 wherein tracking a frequency of a hot tone in each monitored can comprises utilizing a cumulative probability density function of a normal distribution and a mean and a variance selected to achieve a desired probability of LBO for a given RMS value of the LBO tone.

6. A method in accordance with claim 3 further comprising enhancing the determined probability of LBO utilizing an RMS ratio that reflects relative change in the three tones consisting of the LBO tone, the cold tone, and the hot tone.

7. A method in accordance with claim 6 further comprising limiting said RMS ratio utilizing a threshold tuned utilizing historical LBO data.

8. A method in accordance with claim 6 wherein said utilizing the extracted tones and the tracked frequency to determine a probability of an LBO further comprises determining a maximum probability over a set of all monitored cans to determine a probability of an LBO.

9. A method in accordance with claim 3 wherein said determined probability is dependent upon changes in the LBO tone, the cold tone, and the hot tone, and upon frequency shifting of the hot tone.

10. A method in accordance with claim 3 further comprising normalizing said determined probability utilizing a nonlinear normalization.

11. A method in accordance with claim 10 wherein said nonlinear normalization comprises a sigmoid function.

12. An apparatus for predicting lean blow-outs (LBOs) in a gas turbine engine, said apparatus configured to:

extract a plurality of tones from signals representative of pressure within monitored combustor cans;
track a frequency of a hot tone in each monitored can; and
utilize the extracted tones and the tracked frequency to determine a probability of an LBO.

13. An apparatus in accordance with claim 12 wherein said determined probability of an LBO is higher when the hot tone weakens and its frequency is shifted.

14. An apparatus in accordance with claim 12 wherein to extract a plurality of tones, said apparatus is configured to extract, for each monitored can, an LBO tone, a cold tone, and a hot tone, and determine RMS values for each said tone.

15. An apparatus in accordance with claim 14 wherein to extract a plurality of tones, said apparatus is configured to downsample the pressure signals, and to extract an LBO tone, a cold tone, and a hot tone comprises utilizing band pass filters having pass bands of 10-25 Hz, 80-120 Hz, and 130-160 Hz, respectively, to extract each said tone from the downsampled pressure signals.

16. An apparatus in accordance with claim 14 wherein to track a frequency of a hot tone in each monitored can, said apparatus is configured to utilize a cumulative probability density function of a normal distribution and a mean and a variance selected to achieve a desired probability of LBO for a given RMS value of the LBO tone.

17. An apparatus in accordance with claim 14 further configured to enhance the determined probability of LBO utilizing an RMS ratio that reflects relative change in the three tones consisting of the LBO tone, the cold tone, and the hot tone.

18. An apparatus in accordance with claim 17 further configured to limit said RMS ratio utilizing a threshold tuned utilizing historical LBO data.

19. An apparatus in accordance with claim 17 wherein to utilize the extracted tones and the tracked frequency to determine a probability of an LBO, said apparatus is further configured to determine a maximum probability over a set of all monitored cans to determine a probability of an LBO.

20. An apparatus in accordance with claim 14 wherein said determined probability is dependent upon changes in the LBO tone, the cold tone, and the hot tone, and upon frequency shifting of the hot tone.

21. An apparatus in accordance with claim 14 further configured to normalize said determined probability utilizing a nonlinear normalization.

22. An apparatus in accordance with claim 21 wherein said nonlinear normalization comprises a sigmoid function.

23. A method for avoiding lean blow-outs (LBOs) in a gas turbine engine, said method comprising:
   extracting a plurality of tones in pressure signals representative of pressure within monitored combustor cans;
   tracking a frequency of a hot tone in each monitored can;
   utilizing the extracted tones and the tracked frequency to determine a probability of an LBO; and
   signaling a controller to take corrective action to prevent an LBO when the determined LBO probability is indicative of an incipient LBO.

24. A method in accordance with claim 23 wherein said determined probability of an LBO is higher when the hot tone weakens and its frequency is shifted.

25. A method in accordance with claim 23 wherein said extracting a plurality of tones comprises extracting, for each monitored can, an LBO tone, a cold tone, and a hot tone, and determining RMS values for each said tone.

26. A method in accordance with claim 25 wherein said extracting a plurality of tones further comprises downsampling the pressure signals, and extracting an LBO tone, a cold tone, and a hot tone comprises utilizing band pass filters having pass bands of 10-25 Hz, 80-120 Hz, and 130-160 Hz, respectively, to extract each said tone from the downsampled pressure signals.

27. A method in accordance with claim 25 wherein tracking a frequency of a hot tone in each monitored can comprises utilizing a cumulative probability density function of a normal distribution and a mean and a variance selected to achieve a desired probability of LBO for a given RMS value of the LBO tone.

28. A method in accordance with claim 25 further comprising enhancing the determined probability of LBO utilizing an RMS ratio that reflects relative change in the three tones consisting of the LBO tone, the cold tone, and the hot tone.

29. A method in accordance with claim 28 further comprising limiting said RMS ratio utilizing a threshold tuned utilizing historical LBO data.

30. A method in accordance with claim 28 wherein said utilizing the extracted tones and the tracked frequency to determine a probability of an LBO further comprises determining a maximum probability over a set of all monitored cans to determine a probability of an LBO.

31. A method in accordance with claim 25 wherein said determined probability is dependent upon changes in the LBO tone, the cold tone, and the hot tone, and upon frequency shifting of the hot tone.

32. A method in accordance with claim 25 further comprising normalizing said determined probability utilizing a nonlinear normalization.

33. A method in accordance with claim 32 wherein said nonlinear normalization comprises a sigmoid function.

34. An apparatus for avoiding lean blow-outs (LBOs) in a gas turbine engine, said apparatus configured to:
   extract a plurality of tones from signals representative of pressure within monitored combustor cans;
   track a frequency of a hot tone in each monitored can;
   utilize the extracted tones and the tracked frequency to determine a probability of an LBO; and
   signal a controller to take corrective action to prevent an LBO when the determined LBO probability is indicative of an incipient LBO.

35. An apparatus in accordance with claim 34 wherein said determined probability of an LBO is higher when the hot tone weakens and its frequency is shifted.

36. An apparatus in accordance with claim 34 wherein to extract a plurality of tones, said apparatus is configured to extract, for each monitored can, an LBO tone, a cold tone, and a hot tone, and determine RMS values for each said tone.

37. An apparatus in accordance with claim 36 wherein to extract a plurality of tones, said apparatus is configured to downsample the pressure signals, and to extract an LBO tone, a cold tone, and a hot tone comprises utilizing band pass filters having pass bands of 10-25 Hz, 80-120 Hz, and 130-160 Hz, respectively, to extract each said tone from the downsampled pressure signals.

38. An apparatus in accordance with claim 36 wherein to track a frequency of a hot tone in each monitored can, said apparatus is configured to utilize a cumulative probability density function of a normal distribution and a mean and a variance selected to achieve a desired probability of LBO for a given RMS value of the LBO tone.

39. An apparatus in accordance with claim 36 further configured to enhance the determined probability of LBO utilizing an RMS ratio that reflects relative change in the three tones consisting of the LBO tone, the cold tone, and the hot tone.

40. An apparatus in accordance with claim 39 further configured to limit said RMS ratio utilizing a threshold tuned utilizing historical LBO data.

41. An apparatus in accordance with claim 39 wherein to utilize the extracted tones and the tracked frequency to determine a probability of an LBO, said apparatus is further configured to determine a maximum probability over a set of all monitored cans to determine a probability of an LBO.

42. An apparatus in accordance with claim 36 wherein said determined probability is dependent upon changes in the LBO tone, the cold tone, and the hot tone, and upon frequency shifting of the hot tone.

43. An apparatus in accordance with claim 36 further configured to normalize said determined probability utilizing a nonlinear normalization.

44. An apparatus in accordance with claim 43 wherein said nonlinear normalization comprises a sigmoid function.

* * * * *